July 16, 1963
S. J. GRESKO
3,097,388
SHOE SCRAPING DEVICE
Filed July 31, 1962
3 Sheets-Sheet 1
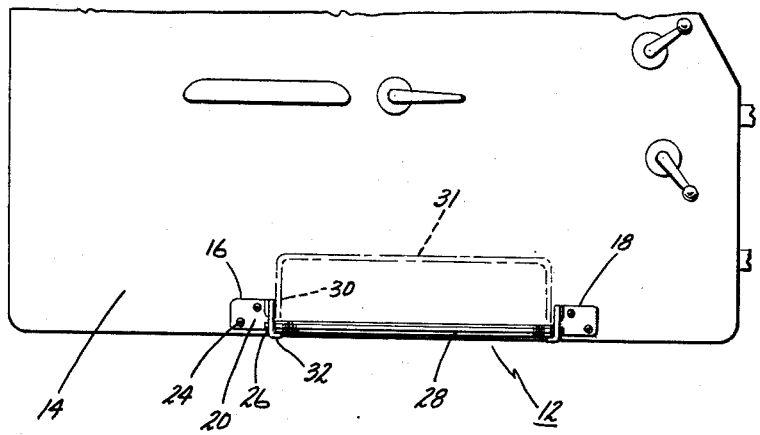
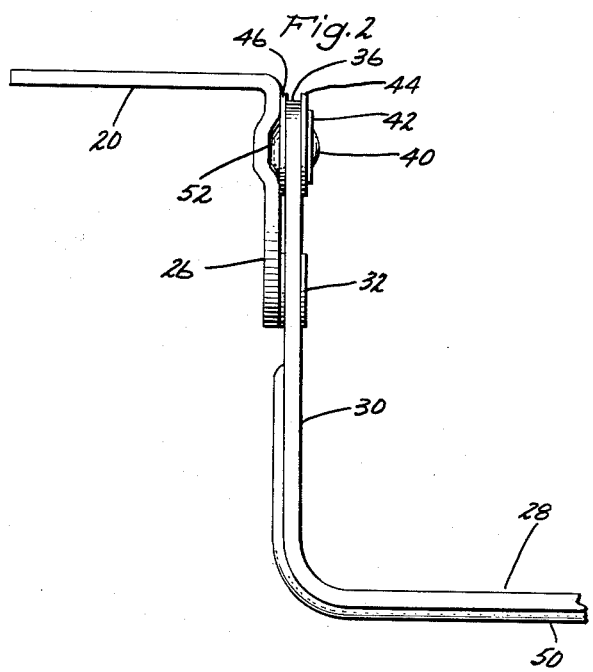
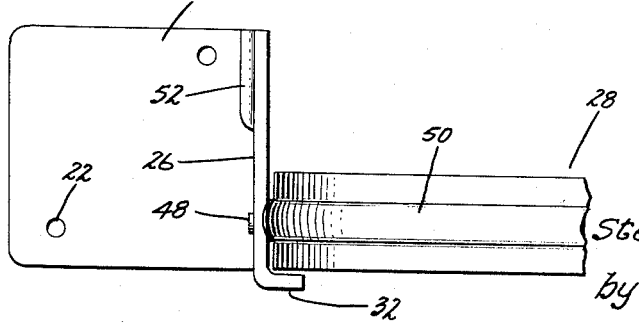
Inventor:
Stephen J. Gresko,
by Hood, Gust & Irish
Attorneys.

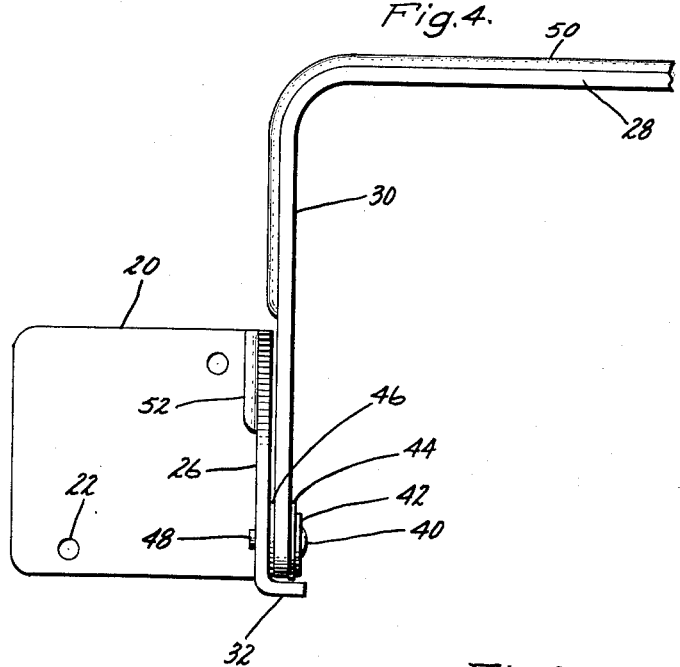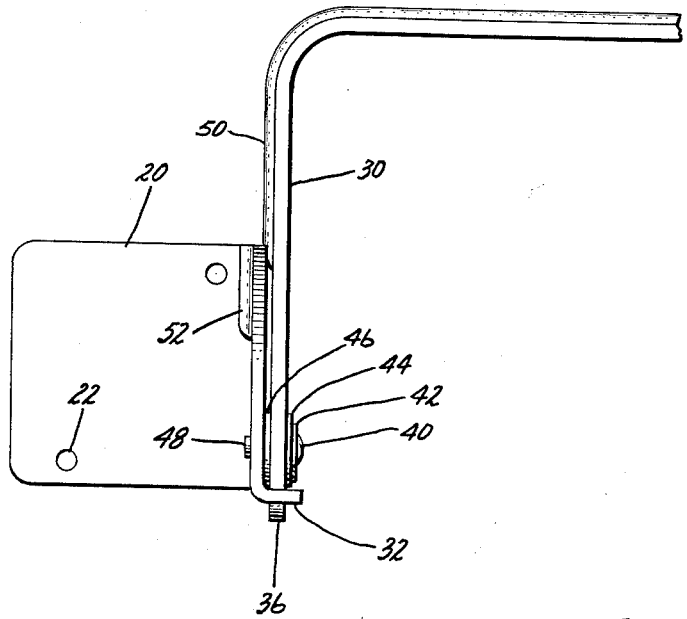

July 16, 1963 S. J. GRESKO 3,097,388
SHOE SCRAPING DEVICE
Filed July 31, 1962 3 Sheets-Sheet 3
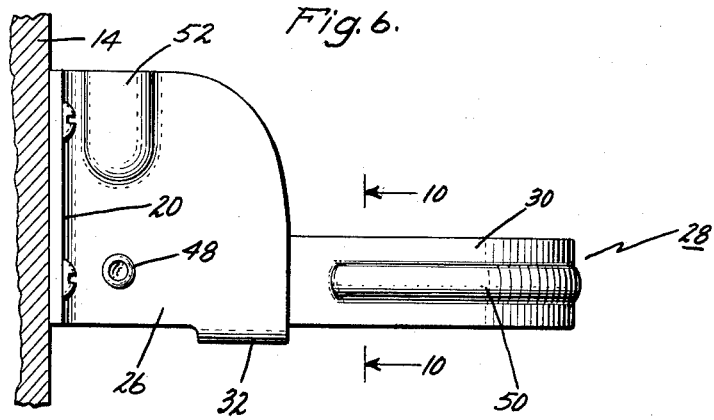
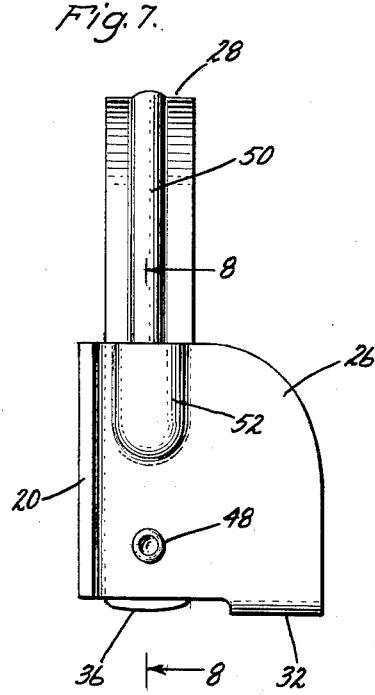
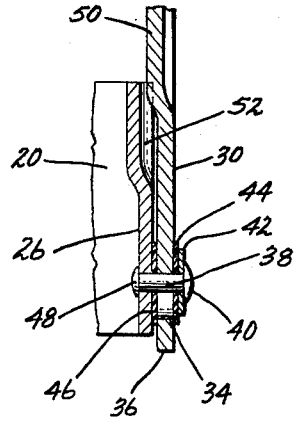
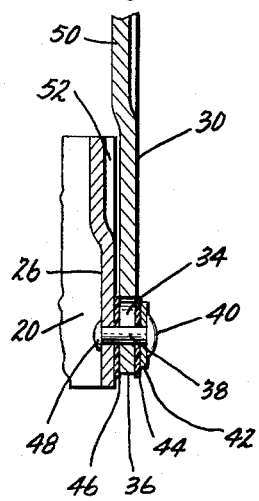
Inventor:
Stephen J. Gresko,
by Hood, Gust & Irish
Attorneys.

United States Patent Office 3,097,388
Patented July 16, 1963

3,097,388
SHOE SCRAPING DEVICE
Stephen J. Gresko, Fort Wayne, Ind., assignor of one-half to Doyle C. Shady, Fort Wayne, Ind.
Filed July 31, 1962, Ser. No. 213,769
2 Claims. (Cl. 15—237)

This invention relates generally to devices for scraping mud, snow, etc. from shoes, and more particularly to a shoe scrapping device adapted for attachment to a vehicle.

Persons entering a vehicle, such as a passenger car, frequently have mud and/or snow accumulated on their shoes which normally is carried into the vehicle, causing soiling of the floor, upholstery, etc. It is therefore desirable to provide, particularly as an attachment, a device for scraping shoes prior to entering the vehicle. While numerous devices of this general character have been proposed, they have either been in a form requiring installation as original equipment in the vehicle when manufactured, or have been characterized by their complexity and thus relatively high cost.

It is accordingly an object of my invention to provide an improved shoe scraping device.

Another object of my invention is to provide an improved shoe scraping device adapted for ready attachment to the door of a vehicle.

A further object of my invention is the provision of an improved shoe scraping device for vehicles characterized by its simplicity and relatively low cost.

My invention in its broader aspects comprises a pair of angle brackets each having a first flange adapted to be mounted on the inner surface of a door of a vehicle and a second flange extending outwardly therefrom. A generally U-shaped scraping member is provided having its legs respectively pivotally connected to the second flanges and extending therebetween so that the scraping member is pivotally movable between a first upwardly extending or storage position in a first plane generally parallel with the first flanges and the door, and a second operative position in a second plane generally at right angles to the first flanges and the door and extending outwardly therefrom. With this arrangement, a person entering the vehicle upon opening the door can first sit upon the seat and then, with the door still open and his feet still outside of the vehicle, can with his foot lower the scraping member to its operative position, scrape the accumulated mud from his shoes, raise the scraping member back to its storage position with his foot, and then swing his feet into the vehicle and close the door.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawing:

FIG. 1 is a fragmentary side view showing the improved shoe scraping device of my invention installed on a typical passenger automobile door;

FIG. 2 is a fragmentary top view of my invention in its operative position;

FIG. 3 is a fragmentary side view of the device of the invention in its operative position;

FIG. 4 is a fragmentary side view of the device in its storage position prior to latching;

FIG. 5 is a view similar to FIG. 4 showing the device in its latched position;

FIG. 6 is an end view of the device in its operative position;

FIG. 7 is an end view of the device in its latched position;

FIG. 8 is a fragmentary cross-sectional view taken along the line 8—8 of FIG. 7;

FIG. 9 is a fragmentary cross-sectional view similar to FIG. 8 but showing the device in its unlatched position; and FIG. 10 is a cross-sectional view taken along the line 10—10 of FIG. 6.

Referring now to the figures of the drawing, the improved shoe scraping device of my invention, generally indicated at 12, is shown as being attached to the inner surface of a passenger automobile door 14 adjacent the lower edge thereof. The device comprises a pair of angle bracket members 16 and 18 each having a mounting flange 20 respectively having suitable holes 22 formed therein by which the mounting flanges are respectively secured to the inner surface of door 14 by suitable screws 24. Each of the angle brackets 16, 18 has an outwardly extending flange 26 and a generally U-shaped scraping member 28 is provided extending between the flanges 26 of the brackets 16, 18 and with its legs 30 respectively connected to the flanges 26, as will be hereinafter more fully described. The scraping member 28 may thus be moved from an upper or storage position as shown in dashed lines in FIG. 1, and in FIGS. 4, 5 and 7 in which it is in a plane generally parallel with the flanges 20 and the surface of door 14, to a lower operative position as shown in solid lines in FIG. 1, and in FIGS. 2, 3 and 6 in which it is in a plane generally at right angles to flanges 20 and the surface of door 14.

In order to support scraping member 28 in its operative position, each of the flanges 26 has a stop member 32 integrally formed from its lower edge and engaging the lower edge of the respective leg 30 of the scraping member 28 when in its operative position, as best seen in FIGS. 3 and 6.

In order to provide for pivotal connection of the scraping member 28 to the flanges 26, and also to provide for latching the scraping member in its upper or storage position, each leg 30 of the scraping member 28 has an elongated slot 34 formed therein and parallel therewith adjacent its end 36. A pivot pin 38 is secured to each of the flanges 26 and is received within the respective slot 34 of the respective leg 30. In the illustrated embodiment, the pivot pin 38 takes the form of a rivet having a head 40 with a metal washer 42 and a nylon washer 44 assembled thereon on one side of the respective leg 30, and with another nylon washer 46 assembled thereon between the respective leg 30 and the flange 26, the rivet being headed as at 48 to complete the assembly. It will be observed that by virtue of the cooperative relationship of the pins 38 and the flange 34, the scraping member 28 when in its upper or storage position can be moved between an upper unlatched position as shown in FIGS. 4 and 9 and a lower latched position as shown in FIGS. 5, 7 and 8.

In order to provide for latching the scraping member 28 in its upper or storage position, scraping member 28 has a rib 50 formed on its outer surface and extending downwardly on its legs 30 part of the way toward ends 36 thereof. The surfaces of flanges 26 which are respectively adjacent the legs 30 of the scraping member 28 have shallow grooves 52 formed therein and extending downwardly from their top edges. When the scraping member 28 is in its upper or storage position and further pulled upwardly to its unlatched position as shown in FIGS. 4 and 9, it will be seen that the rib 50 on each leg 30 is free of the groove 52 in the respective flange 26, thus permitting the scraping member 28 to be pivoted downwardly to its operative position as shown in FIGS. 2, 3 and 6. However, by virtue of the cooperative relationship of pin 38 in slot 34 and legs 30 and their respective flanges 26, when the scraping member 28 has been moved upwardly to its first position, it can then be pushed downwardly into its latched position in which the ends of the ribs 50 on the legs 30 are received within the respective grooves 52 thus latching the scraping member 28 in its storage position, as seen in FIGS. 5, 7 and 8.

It will now be readily seen that when a person is entering the vehicle, he will first open the door and may then sit sidewise upon the seat with the door still open and with his feet still outside of the vehicle. At this point, the scraping member 28 will be in its latched storage position as shown in FIGS. 5, 7 and 8. He may then with one foot raise the scraping member 28 to its unlatched position as shown in FIGS. 4 and 9 and then pivoted downwardly to its operative position as shown in FIGS. 1, 2, 3 and 6. After having scraped the mud, etc. from his shoes with the scraping member 28, he may then again with one foot raise the scraping member 28 to its upper unlatched position and then push it downwardly to its latched storage position. Having thus cleaned his shoes, he may then swing his feet into the vehicle and close the door.

It will be readily seen that the improved shoe scraping device of my invention is characterized by its simplicity and thus relatively low cost, and by its ease of attachment to existing vehicles. My device thus lends itself ideally to merchandizing as an attachment since it can be readily installed by the customer.

While I have further illustrated and described a specific embodiment of my invention, further modifications and improvements will occur to those skilled in the art and I desire therefore in the appended claims to cover all modifications which do not depart from the spirit and scope of my invention.

What is claimed is:

1. A shoe scraping device for vehicles comprising: a pair of spaced angle brackets each having a first flange adapted to be mounted on the inner surface of a door of said vehicle and a second flange extending outwardly therefrom; and a generally U-shaped scraping member extending between said brackets and having its legs respectively pivotally connected to said second flanges whereby said member is pivotally movable between a first storage position in a first plane generally parallel with said first flanges and a second operative position in a second plane generally at right angles to said first flanges and extending outwardly therefrom, each of said pivotal connections of said scraping member legs to said second flanges comprises a pivot pin secured to the respective second flange and an elongated slot formed in the respective leg parallel therewith and receiving said pin, said slots and pin respectively cooperating to permit movement of said scraping member in said first plane when in said first position thereof between lower latching and upper unlatched positions, said second flanges respectively having grooves formed therein and said scraping member legs respectively having projections thereon, said projections being respectively received in said grooves when said scraping member is in its first and latching position thereby latching said scraping member in its first position, said projections being respectively free of said grooves when said scraping member is in its first and unlatched position whereby said scraping member may be pivoted to its second position.

2. A shoe scraping device for vehicles comprising: a pair of angle brackets each having a first flange adapted to be mounted on the inner surface of a door of said vehicle and a second flange extending outwardly therefrom, said brackets being disposed with their second flanges in spaced parallel relationship and their first flanges respectively extending in opposite directions; and a generally U-shaped scraping member extending between said brackets with its legs respectively adjacent said second flanges, each of said legs having an elongated slot formed therein and parallel therewith adjacent its end, each of said second flanges having a pivot pin secured thereto and received in the slot of the respective leg thereby supporting said scraping member for pivotal movement between a first upright storage position in a first plane generally parallel with said first flanges and a second operative position in a second plane generally at right angles to said first flanges and extending outwardly therefrom beyond said second flanges, each of said second flanges having a stop integrally formed from its lower edge and extending toward the other second flange, said stops being adapted respectively to engage and support said legs when said scraping member is in said second position thereof, said slots and pins respectively cooperating to permit vertical movement of said scraping member when in said first position thereof between lower latching and upper unlatched positions, said second flanges respectively having grooves formed in their sides which are respectively adjacent said legs, said legs respectively having projections formed on their sides which are respectively adjacent said second flanges, said projections being respectively received in said grooves when said scraping member is in its first and latching position thereby latching said scraping member in its first position, said projections being respectively free of said grooves when said scraping member is in its first and unlatched position thereby permitting movement of said scraping member to its second position.

References Cited in the file of this patent

UNITED STATES PATENTS

| | | |
|---|---|---|
| 590,268 | Lee | Sept. 21, 1897 |
| 1,212,111 | Roos | Jan. 9, 1917 |
| 2,818,594 | Dawkins | Jan. 7, 1958 |